United States Patent [19]
Campbell, Jr. et al.

[11] 3,798,541
[45] Mar. 19, 1974

[54] CAPACITIVE PROBE STRUCTURE FOR TESTING THE INTEGRITY OF ELECTRICAL CABLES AND CONDUCTORS

[75] Inventors: Richard H. Campbell, Jr., Gilford; William B. Wilkens, Laconia, both of N.H.

[73] Assignee: Wilcom Products, Inc., Laconia, N.H.

[22] Filed: June 26, 1972

[21] Appl. No.: 266,367

Related U.S. Application Data

[62] Division of Ser. No. 85,617, Oct. 30, 1970, Pat. No. 3,711,767.

[52] U.S. Cl. ............... 324/72.5, 324/52, 324/61 P, 324/149
[51] Int. Cl. .......................... G01r 31/02, G01r 1/06
[58] Field of Search ....... 324/52, 54, 61 P, 64, 72.5, 324/149

[56] References Cited
UNITED STATES PATENTS
2,802,173  8/1957  Nisle ............................... 324/64 X
2,804,592  8/1957  Giskeborn ........................ 324/61 P
2,428,700  10/1947  Eilenberger ..................... 324/61 P
1,745,419  2/1930  Henneberger ................... 324/52 X
2,307,499  1/1943  Frakes .............................. 324/54
2,750,562  6/1956  Starr ................................. 324/54
2,885,636  5/1959  Rasor ............................... 324/54
3,068,409  12/1962  Bigliano et al. ............... 324/72.5 X
3,444,465  5/1969  Teixeira .......................... 324/72.5

Primary Examiner—Gerard R. Strecker
Attorney, Agent, or Firm—Reuben T. Carlson

[57] ABSTRACT

This invention relates to a probe structure designed to be capacitively coupled to an insulated electrical cable or conductor, and which is operative to pick up relatively weak electrical signals induced on or carried by a selected part of the cable or conductor, and to convert said signals into output voltages capable of audible or scientific measurement.

12 Claims, 17 Drawing Figures

CAPACITIVE PROBE STRUCTURE FOR TESTING THE INTEGRITY OF ELECTRICAL CABLES AND CONDUCTORS

This application is a division of parent application Ser. No. 85,617 filed Oct. 30, 1970, and now U. S. Pat. No. 3,711,767, granted Jan. 16, 1973.

THE PROBLEM

Some of the major contributing factors affecting the induction of noise in telephone circuits which are entirely in the cable, are defective bonding of cable shield splices and faulty bonding of cable shields to suitable grounds. In practice, the assembly and environmental limitations of bonding techniques used in the past have resulted in a serious accumulation of defective bonds with a consequent introduction of excessive noise in telephone circuits.

When two sections of cable are spliced together it is essential to have a good bond between the shields in adjacent cable sections to prevent any noise from being induced in the cable contained communication wires. A break in the bond or a defective bond resulting from corrosion or cracks in the bonding medium can result in severe noise problems. While only one high resistance bond or one completely open bond may not introduce much noise, the cumulative effect of a number of defective bonds can result in severe noise conditions.

Reliable and quickly applied instruments are required to effectively determine the adequacy of grounding and shield splicing, so that positive measures can be taken to minimize the effects of the induction of undesirable signals or electrical noise and keep the amplitude of such signals within acceptable limits. Without suitable instruments to detect these defects, it is necessary to use laborious methods of disassembling splices for physical examination of each splice, or use cable and splice damaging picks or probes to penetrate the insulation for making electrical measurements directly on the shield. Neither method is satisfactory, since visual inspection cannot reliably detect the defect, and penetrating the outer insulation on cables often leads to further trouble which requires complete replacement of an otherwise satisfactory splice or cable.

PURPOSE OF THIS INVENTION

This invention relates to a probe structure for testing the quality, integrity, continuity and grounding of splices and shields of communication cables, where direct electrical connection to the shield for test purposes is not feasible; and in general, for testing the continuity of connections between any two conductors which may have current flowing or have induced voltages on them, and for locating defects or faults in cables and splices. While this invention is particularly useful for evaluating splices and bonds on shields of telephone, television, radio, and other similar cables, its use may be extended to evaluating the splicing or bonding assemblies of other wires or cables such as ground wires, power conductors, and the like.

In general, it is the purpose of this invention to provide a new and improved probe structure for use in locating and determining the nature of faults that may exist in splices and connections of insulated cables, cable shields, or wired arrangements.

It is a further purpose of this invention to provide a probe structure, which can be used singly or as a pair, in conjunction with a measuring set and whereby measurements can be taken of the potential difference between the two probes, and whereby a determination can be made as to the quality of the bond and the flow of current in the cable shield, and whereby measurements can be taken of the voltage picked up by each probe with reference to ground and which thereby provides the necessary technical information for analyzing the conditions existing on the cable.

It is a further object of this invention to provide a probe structure designed to be coupled to a cable or conductor to be tested, and which is relatively insensitive to variations in the degree of coupling such as might be caused by different thickness and dielectric constants of the insulating materials used on the cable or splice.

It is a further objective to provide means for supporting and positioning a pair of similar probes in a manner to insure proper signal contact between the probes and the cable or wire under test, with resultant reliable readings of the transmitted signals, and which permits proper alignment of the probes to the axial slope of the cable which may vary in different installations.

GENERAL DESCRIPTION OF THIS INVENTION

The probe structure of this invention is adapted to be effectively used in pairs, and in conjunction with a measuring set or voltmeter, for making tests of the quality of shield bonds and ground connections, and for making a more comprehensive study of conditions existing on cable shields at various locations such as cable vaults, manholes, crossconnect boxes and at various points along an accessible cable and all accessible splices. The conditions which can be detected may not only be responsible for introducing noise in a cable but may also have a bearing on the degree of protection against voltage surges and lightning provided by the cable shield.

For example, the apparatus of this invention is designed to determine if there is good bonding between the shields of sections of cable, and to determine if any of the following condition exist:

1. No bond between the shields of two or more sections.
2. An intermittent or high resistance band which may result from a corroded joint between bonding straps or between lashing wire and the cable shield, or defective bonding clamps and broken bonds.
3. The condition of capacitors used across insulated joints.
4. Bad ground connections to cables, ground busses, or cross-connect boxes.

This invention also embraces means for applying a pair of similar probes, by hand or with "lay-up sticks," to aerial cables from the ground. It may be used on aerial cable, pedestals, in manholes, in cable vaults, and at any point where there is access to a cable such as at crossconnect or terminal boxes.

Each probe assembly consists of a pickup electrode and a unity gain ultra high input impedance converting circuit. Noise signals existing on the cable shield are capacitively coupled, through the cable insulation, to the pickup electrode. This coupling capacitance is small, representing a high series impedance at power frequencies, and is also subject to large variations caused by field conditions. To make the pickup substantially independent of these variations, the input impedance of the converting circuit must be some two orders of magnitude higher than typical input coupling impedance.

To obtain this ultra-high input impedance, a combination field effect transistor and integrated circuit unity-gain voltage follower is used. A shield electrode, laminated to the probe base under the pickup electrode, and also all circuit points which might otherwise constitute stray-capacitance input shunts, are connected to the follower output to provide a driven shield. The follower circuit also provides a low output impedance, making it possible to connect the probe assembly to the measuring set through a fairly long unshielded cable. A printed circuit board is mounted on the bottom of the probe base.

The signals from a pair of similar probes A and B may be connected through a switch to an input transformer of the measuring set. The difference between the voltages picked up by each probe with respect to ground will be measured when the switch is in the A to B position. When the switch is in the A to GND or the B to GND position, the voltage picked up by each probe with respect to ground may be measured. The ground terminal of the measuring set should be connected to a suitable ground.

These two probes may be held by hand when it is possible to get direct access to the cable splice. When splices on aerial cables are to be checked from the ground, the probes may be mounted on a set of poles assembled into a T or cross formation. An extension line connects the probe conductors to the measuring set when the aerial cable is to be tested from the ground. Each probe is pivoted to permit alignment with the slope of the cable.

DESCRIPTION OF DRAWING

For a better understanding of the present invention together with the objectives thereof, reference is made to the accompanying drawings and the following description.

FIG. 7b is an enlarged fragmentary cross section of the probe head block shown is FIG. 7 and which more clearly illustrates its structural laminates.

Similar reference characters refer to similar parts throughout the drawing figures and this specification.

Figures 15, 16:
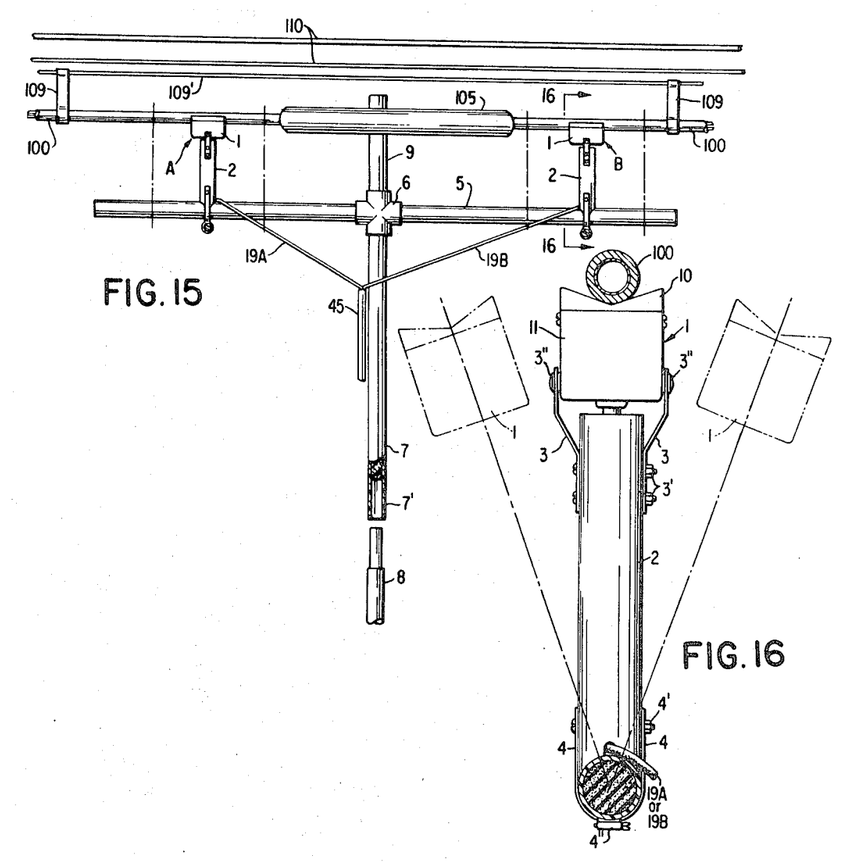
FIG. 15 is a plan elevation of a pair of testing probes made in accordance with this invention as they would appear when adjustably mounted on a crossbar supported by a manually manipulated pole; this view also showing the probe heads applied across a cable section such as a splice to be tested; this view further showing the cable positioned adjacent a suspended power line whose surrounding electrical and magnetic fields may be the cause of electrical disturbances and interference in the cable wiring if the cable shielding is defective.
FIG. 16 is an end elevated view of one of the testing probes as the same would appear when viewed along line 16—16 of FIG. 15; this view illustrating the lateral adjustability of the probe on the supporting crossbar.

Noise producing disturbances in the communication wires often stem from the electrical and magnetic fields which surround a power line 110 positioned adjacent the telephone cable run, as indicated in FIG. 15. For example, power lines and telephone cables are often suspended from the same utility poles, with the telephone cable suspended by straps 109 from a wire cable 109' positioned adjacent the power line 110 as shown in FIG. 15. Under such conditions, any defect in the continuity of the cable shielding results in objectionable disturbances and noise in communication transmission.

THE PROBE HEAD AND ITS SUPPORTING STRUCTURE as shown in FIGS. 1-7, the probe head 1 comprises a probe block 10 formed from a nonconducting plastic, such as bakelite, and which presents a V-shaped face 10a designed to be telescoped over the cable section to be tested. The V-shaped face of the block 10 presents a pickup electrode 12 in the form of a V-shaped copper plate. Positioned below and in insulated relation to the pickup electrode 12, is a shielding electrode 14 in the form of a V-shaped copper plate which is somewhat wider and longer than the pickup electrode 12.

Figures 1, 2, 3, 5:
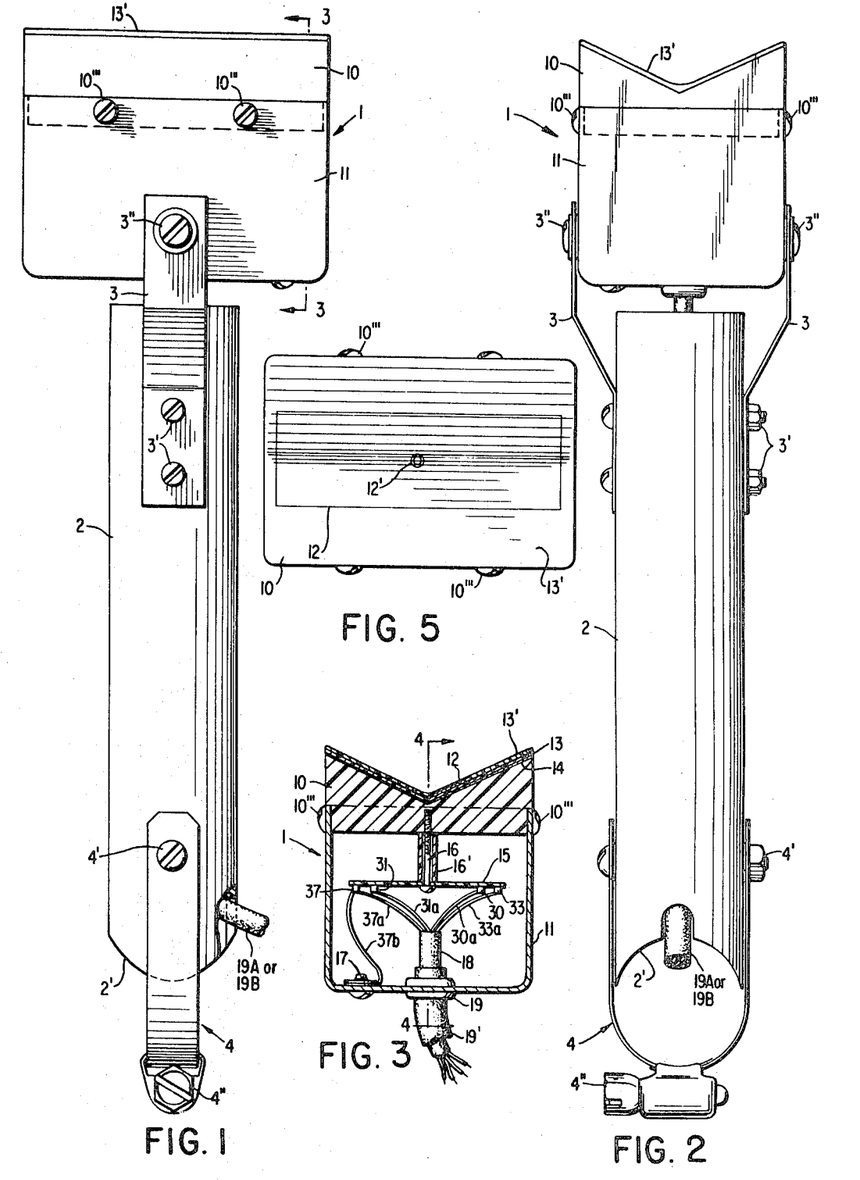
FIG. 1 is a side elevational view of the probe in substantially actual size, and which comprises the probe head adjustably mounted on a tubular handpiece, the handpiece being equipped with an adjustable crossbar securing clamp at the lower end thereof.
FIG. 2 is an end elevational view of the probe shown in FIG. 1.
FIG. 3 is a transverse cross section of the probe head as it would appear when viewed along line 3—3 of FIG. 1, this view showing certain structural details thereof.
FIG. 5 is a top plan view of the probe head shown in FIGS. 3 and 4.

As shown in FIGS. 1–6, the probe block 10 is supported on the rim of a probe box 11 which may be approximately 3 inches long by 2 inches wide by 2 inches high. The box 11 is preferably molded from a plastic or metallic composition characterized by substantial mechanical strength and which will withstand the shock of high voltage without breakdown and which permits adequate shielding for the electronic circuitry therein. The plastic block 10 presents a contracted bottom section 10' which defines an inset shoulder 10'' which seats on the upper rim of the probe box 11. The block 10 is secured to the side walls of the box 11 by a series of screws 10''', as shown in FIGS. 3 and 5. The probe box 11 contains electronic impedance converting circuitry as hereafter described.

Figures 6, 7, 7A:
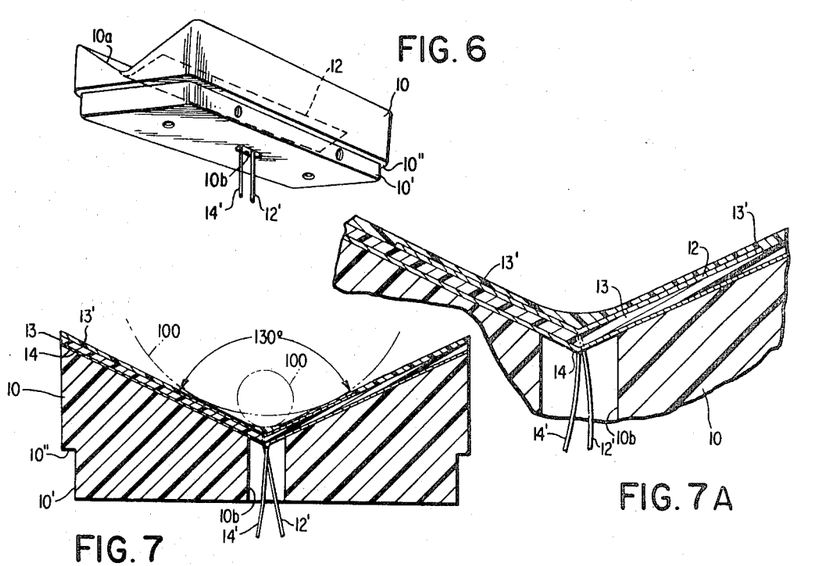
FIG. 6 is a perspective view of the probe head block shown in section in FIGS. 3 and 4, and which supports a pair of insulated electrical energy conducting plates or electrodes connected to a pair of signal wires extending through the block.
FIG. 7a is an enlarged transverse cross section of the probe head block and insulated electrical energy conducting plates as the same would appear when viewed along line 7—7 of FIG. 4.
Figure 8:
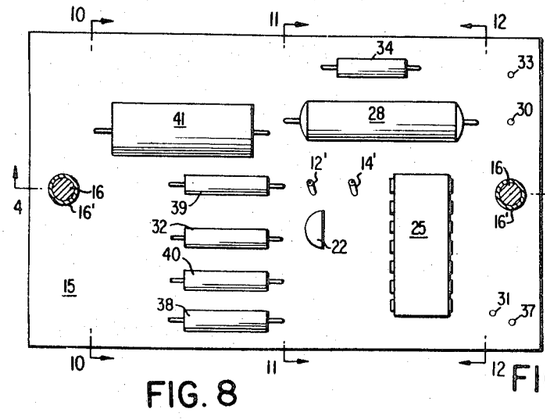
FIG. 8 is a top plan view of the electronic components comprising the probe amplifying circuitry which are supported on the top side of a nonconducting board contained within the probe head and as the same would appear when viewed in the direction of the arrows 8—8 of FIG. 4.

The V-shaped shielding electrode 14 is bonded with an appropriate adhesive by heat and pressure to the upper V shaped face of the plastic block 10. The V shaped shielding electrode 14 is also bonded to and insulated from the V shaped pickup electrode 12 by an insulating laminate 13 formed of two layers of a polyimid plastic. The upper face of the V shaped pickup electrode 12 and the surrounding surface, is coated with a layer 13' of a plastic such as a polyimid to provide a smooth cable contacting surface which resists physical abrasion, and provides voltage protection. The plastic baseblock 10, the shielding electrode 14, the plastic insulating laminate 13, the pickup electrode 12 and the plastic coating layer 13' are bonded together into a compact unit under heat and pressure, producing a structure which is best shown in FIG. 7A. To insure effective electrical contact between the V shaped pickup electrode 12 and various cables of both large and small diameters, it has been found that the V angle as shown in FIG. 7 should be in the order of 90° to 150°, and preferably in the order of approximately 130°.

The probe head 1 is desirably supported by a handpiece or stem section 2 which may be formed of fiber glass reinforced plastic tubing as shown in FIGS. 1, 2 and 16 which may be approximately 6 to 12 inches long to provide a convenient handpiece. The stem section 2 may be filled with urethane foam or similar material to exclude the entry of moisture therein. The probe circuit containing box 11 is adjustably connected to the tubular handpiece 2 by a pair of diametrically opposed pivot brackets 3 secured as by screws or bolts 3' to the upper portion of the tubular handpiece 2. The upper end of the paired pivot brackets 3 are pivotally connected to the opposite sidewalls of the probe box 11 by friction screws 3'' which permits the probe head to be frictionally held in a tilted position which best accommodates the cable section to be tested.

To provide for convenient application of a pair of similar probe heads to an overhead cable section to be tested, the handpiece or stem sections 2 of both probes A and B may be adjustably supported on a crossarm 5 of convenient length for test purposes, as shown in FIGS. 15 and 16. The crossarm 5 may be medially connected by a four way coupling 6 to a layup pole 7, whose lower end may be provided with a ferrule connection 7' for application of an extension pole 8 as indicated in FIG. 15. A bracing extension 9 which may be secured to the coupling 6 can be conveniently braced against the cable section under test to insure quick and convenient application of the probe heads 1 to the cable section. The crossbar 5, layup pole 7, pole extension 8 and bracing extension 9 may all be tubular in form, made from fiber glass reinforced plastic and filled with a urethane foam or similar material to exclude moisture.

The lower ends of the probe stems 2 are adjustably secured to the crossarm 5 by means of an adjustable clamp 4 of U shaped form, as shown in FIGS. 1, 2, 15 and 16. The lower end 2' of each probe stem 2 is arcuate in form to snugly saddle against the upper side of the crossbar 5, while the lower and lateral sides of the crossbar are gripped by the side legs of the U clamp 4 as shown in FIGS. 15 and 16. The upper portions of the paired side legs of the clamp 4 are pivotally secured to the lower end of the probe stem 2 by a through bolt 4' which may be tightened and adjusted as desired. The side legs of the U clamp 4 are connected by takeup means 4'' for tightening the clamp in frictional embracing relation to the crossarm 5.

This mounting arrangement permits contact accommodation of the probe head to any overhead section of cable to be tested. For example, tilting the probe head 1 on the probe stem 2 may be accomplished by adjusting the clamp screws 3'' which secures the paired pivot brackets 3 to the probe head 1; by adjusting the takeup means 4'' of the clamp 4 the probe head 1 and its supporting stem 2 may be laterally swung into any desired position as shown in FIG. 16; and by manipulating the clamp 4 the probes A and B may be adjustably fixed in any desired spaced position along the crossbar 5. It will also be appreciated that the probe head supporting stems 2 may be removed from the crossbar 5 and hand supported, in cases where the position of the cable to be tested, such as in manholes or the like, would indicate.

The probe head is mechanically constructed to provide the most effective degree of coupling between the pickup electrode 12 and the wire or cable to be tested for a range of cable or wire diameters, as indicated in FIGS. 7 and 16, by shaping the V shaped upper face 10a in a form which will accept a wide range of cable diameters.

As shown in FIG. 7A, the copper shielding electrode 14 is laminated to the upper face 10a of the base block 10, and the size of this shielding electrode 14 covers the angular upper face 10a of the base block to within approximately 1/16'' of the exterior edges thereof, thus allowing the superimposed laminating layer 13' to not only cover the shielding electrode 14, but to adequately cover and protect the edges of the electrode 14 from electrical contact with any conductor, and thus provide a thickness of material which will insure a low dielectric constant and will keep the capacitance between the shielding electrode 14 and pickup electrode 12 to a minimum. This should not exceed five times the coupling capacitance between the cable and pickup electrode 12 which is laminated to the insulation 13.

Figure 4:
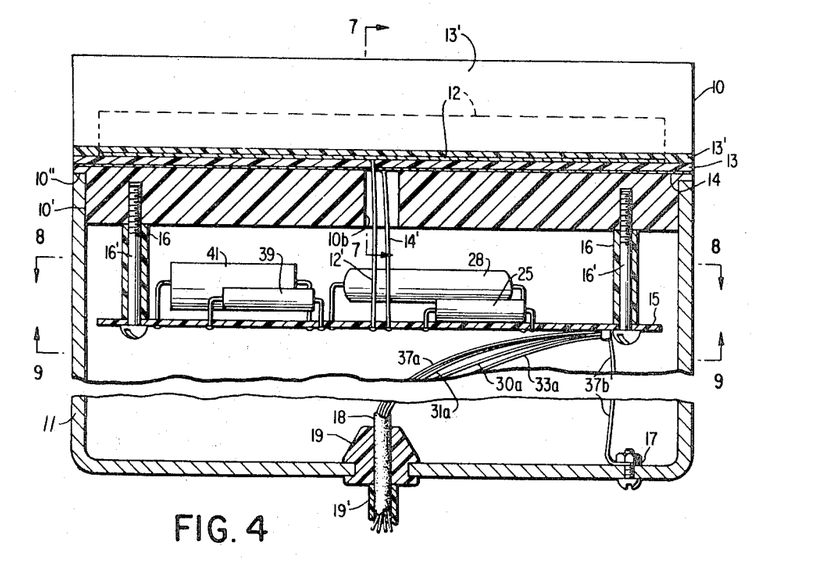
FIG. 4 is an enlarged longitudinal cross section of the probe head as the same would appear when viewed along line 4—4 of FIG. 3, this view showing further details of the probe head construction.

The layer of insulation 13' possesses high dielectric and mechanical resistance to abrasion, and is laminated over the whole assembly to provide protection against contact with dangerous high voltages, and which will withstand the abuse of normal use. As shown in FIGS. 4, 6 and 7, lead terminals 12' and 14' which are electrically attached to the pickup electrode 12' and the shielding electrode 14, are passed through a bore 10b in the nonconducting baseblock 10 with adequate electrical clearance, and are in turn connected to an input amplifier forming a part of the probe circuitry 20. In order to keep the leads 12' and 14' extending from the pickup electrode 12 and the shielding electrode 14 as short as possible, and thereby minimize stray capacitance between the pickup electrode 12 and ground, the probe circuitry 20 is supported by a nonconductive mounting board 15 contained within the head box 11 and positioned as close as conveniently possible to the lower end of the baseblock 10. As shown in FIGS. 3, 4 and 8–9, the nonconducting board 15 is suspended within the probe box 11 by a pair of screws 16 and associated spacer collars 16' from the bottom side of the nonconductive headblock 10.

The Probe Circuitry

As shown in FIGS. 3, 4 and 8–13, the electronic components supported on the circuit board 15 in each probe head 1 include, a field effect transistor 22 whose gate 21 is connected to the lead terminal 12' of the pickup electrode 12; an operational amplifier 25 of voltage follower configuration; five resistors 32, 34, 38, 39 and 40; two capacitors 28 and 41; direct current negative and positive voltage supply terminals 31 and 33 which supply the direct current voltage to the terminals 23 and 29 of the field effect transistor 22 and the terminals 35 and 36 of the operational amplifier 25; a grounding terminal 37; and an output terminal 30 which receives the signals processed by the probe circuitry.

Figure 13:
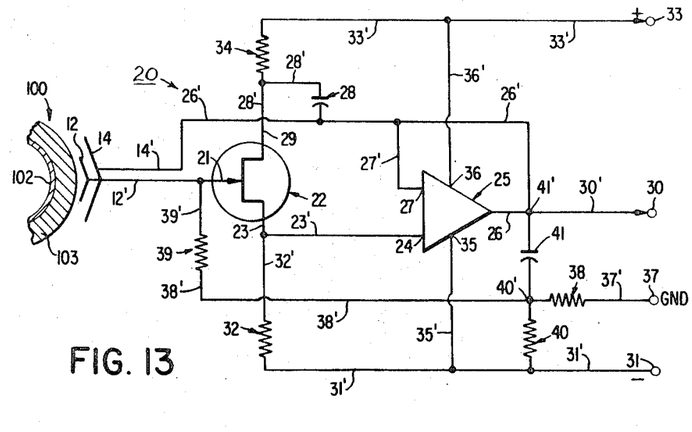
FIG. 13 is a schematic diagram of the probe circuitry.

The pickup electrode 12 is shown in FIG. 13 for purposes of illustration as capacitively coupled through the insulating jacket 103 to the cable shield 102 of the telephone cable 100. The resulting signal is conducted by the pickup lead 12' to the gate 21 of a field effect transistor 22 (commonly called FET) which operates as a source follower. The output from the source terminal 23 of the field effect transistor 22 is connected by lead 23' to the noninverting input 24 of an operational amplifier 25. The output terminal 26 of the operational amplifier 25 is connected by lead 30' to the probe circuit output terminal 30.

It will also be noted that the output terminal 26 of the operational amplifier 25 is connected back to the inverting input terminal 27 of the operational amplifier 25 by leads 26' and 27' in the voltage follower configuration. The signal from the output terminal 26 of the operational amplifier 25 is also conducted back by leads 26' and 14' to the shielding electrode 14 so that the electrode 14 thereby operates as a driven shield. The lead 26' from the terminal 26 of the operational amplifier 25 is also connected to a capacitor 28 which in turn is connected by lead 28' to the drain terminal 29 of the field effect transistor 22.

Figure 9:
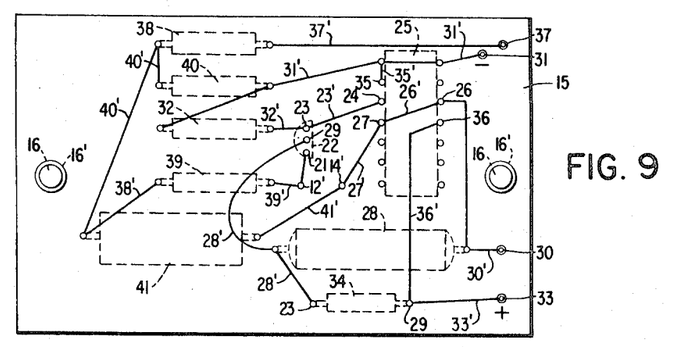
FIG. 9 is a plane view of the underside of the nonconducting board which shows the printed circuitry which electrically joins the electronic components shown in FIG. 8, and as the same would appear when viewed in the direction of the arrows 9 of FIG. 4.
Figures 10, 11, 12:
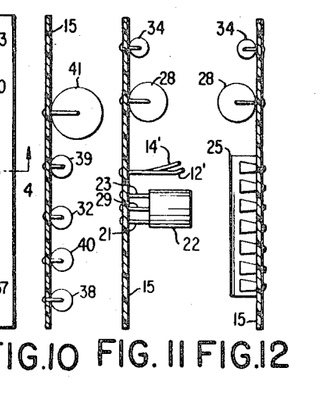
FIGS. 10, 11 and 12 are transverse sections, taken along lines 10—10 and 11—11 and 12—12 of FIG. 8 of the probe head board, and which shows the electronic components electrically joined by the printed circuitry shown in FIG. 9.

The operating power for the field effect transistor 22 and operational amplifier 25 is supplied by a battery (not shown) which may be housed in the case of a measuring set. The circuit board 15 in each probe head box 11 has a battery connected negative voltage supply terminal 31, and a battery connected positive voltage supply terminal 33 as shown in FIGS. 9 and 13.

The negative voltage supply terminal 31 is connected by lead 31' to a resistor 32, which has a lead 32' which is connected to the field effect transistor source terminal 23; and the positive voltage supply terminal 33 is connected by head 33' to a resistor 34 which is connected to lead 28' which extends to the drain terminal 29 of the field effect transistor 22; thus providing the direct current operating power for the field effect transistor 22. The negative voltage supply terminal 35 of the operational amplifier 25 is connected by a lead 35' to lead 31' extending from the negative voltage supply terminal 31; and the positive voltage supply terminal 36 of the operational amplifier 25 is connected by a lead 36' to the lead 33' extending from the positive voltage supply terminal 33.

The lead 37' extending from the ground terminal 37 is connected to a resistor 38 which is in turn connected by lead 38' to a second resistor 39 whose lead 39' is joined to the pickup electrode lead 12' adjacent to its connection to the gate 21 of the field effect resistor 22. The lead 31' from the negative voltage supply terminal 31 is also joined to a resistor 40 as shown in FIGS. 9 and 13, and by a connection 40' to the lead 38' which connects the resistors 38 and 39. The connection 40' is also joined to a capacitor 41 which is connected at 41' to the output terminal 26 of the operational amplifier 25.

Noise signals, at power frequency and its harmonics which exist on the cable shield 102, are capacitively coupled, through the cable insulation 103 to the pickup electrode 12. This coupling capacitance is small, representing a high series impedance at power frequencies. This coupling capacitance is subject to large variation with field conditions, and the manner in which the probe face is placed in relation to the cable section to be tested.

Meaningful readings cannot be obtained if the signal output at the output terminal 30 varies widely with small changes in probe positioning. While dependance on positioning cannot be eliminated entirely, it can be minimized if the effective impedance between the pickup electrode 12 and the ground or reference terminal 37 is made very much higher than the impedance between pickup electrode 12 and the cable shield 102 being measured. The impedance to the cable shield is capacitive, and in a typical case may be on the order of 10 picofarads capacitance, or 250 megohms reactive impedance at 60 Hz. If moderate variations in this impedance to cable shield source are to produce only small output variations, the effective impedance to ground must be several thousand megohms.

The probe circuitry above described, and illustrated in FIGS. 8–13, achieves the ultra-high impedance at the pickup electrode 12, by using a unity gain amplifier, consisting of the field effect transistor 22 and the voltage follower connected operational amplifier 25, and a driven shielding electrode 14 as diagramatically illustrated in FIG. 13. In using this technique, the shielding electrode 14 is made to surround the pickup electrode 12 on all sides, except that which comprises the capacitive impedance to the cable shield source. The shielding electrode 14 is also made to surround all wires and circuit points which are electrically connected to the pickup electrode 12. Also, the pickup electrode 12 is connected through the field effect transistor 22 to the noninverting input 24 of a unity gain, operational amplifier 25 whose input impedance is nominally infinite and actually extremely high.

The shielding electrode 14 is connected to the operational amplifier output terminal 30, by leads 14', 26' and 30'. The capacitive impedance between pickup electrode 12 and shielding electrode 14 may be several times smaller than the impedance which would have been present to ground without the shielding electrode. If the amplifier gain is precisely unity, there is no potential difference across this impedance and so its effective value is infinite. The precise unity gain is approached very closely by using an amplifier 25 with high open loop gain connected in the so called voltage follower configuration. The capacitance to the shielding electrode 14 is theoretically of no importance; in practice it is of far less importance than capacitance to ground, but still should be held to a reasonable minimum.

The probe circuitry embodying the above principle is diagrammatically illustrated in FIG. 13 as applied to a telephone cable, and wherein the pickup electrode 12 is capacitivly coupled through the cable insulation 103 to the cable shield 102 of the telephone cable 100. The pickup electrode 12 is connected to the gate 21 of the field effect transistor 22 which operates as a source follower. The output signal from the source terminal 23 of the field effect transistor 22 is connected by lead 23' to the noninverting input 24 of the operational amplifier 25. The output terminal 26 of operational amplifier 25 is connected back to the inverting input terminal 27 by leads 26' and 27' in the voltage follower configuration. This same signal is also connected by leads 26' and 14' to the driven shielding electrode 14.

The input impedance at the noninverting input 24 of the voltage-follower connected operational amplifier 25, is approximately 400 megohms shunted by 1 picofarad capacitance. This is a very high impedance, but not high enough, which is why the field effect transistor 22 connected as a source-follower is added. Some of the effective high input impedance at the operational amplifier input 24 is lost in the shunt effect of resistor 32 connected by head 31' to the negative voltage supply terminal 31 which supplies operating current for the field effect transistor 22. However, resistor 32 has a high value, so that the source-follower action of the field effect transistor 22 with high impedance source load, results in extremely high input impedance at gate 21.

It is necessary to provide a resistive connection to the gate 21 to establish the proper D.C. operating point. This operating point is established by voltage-divider action of resistors 38 and 40, connected between ground terminal 37 by lead 37' and negative voltage terminal 31 by lead 31'. The voltage-divider output at point 40' is connected by lead 38' through resistor 39 to the gate 21. Although resistor 39 has a value of several megohms, it is so much lower than the required impedance at pickup electrode 12 and gate 21 that it would completely destroy the circuit operation were it not for capacitor 41. This capacitor 41 is connected so as to cause the bias point 40' to follow the signal frequency voltage at the output 26 of operational amplifier 25. Since the overall circuit works at unity gain, or very nearly so, there is thus essentially no signal frequency potential across resistor 39 and so its effective shunt impedance value is essentially infinite.

If the drain terminal 29 of the field effect transistor 22 were directly connected to positive power supply terminal 33, the internal gate to drain capacitance in the field effect transistor 22 would effectively shunt the input and so lower the impedance. This effect is essentially eliminated by means of a bootstrapping connection, where the drain terminal 29 of the field transistor 22 is connected to positive voltage supply 33 by lead 33' through resistor 34 for direct current, and to the operational amplifier output 26 through capacitor 28 at signal frequency.

As shown in FIGS. 3 and 4, the probe circuit board 15 in the probe head 1 supports the ground terminal 37 connected by a lead 37a for connection to the circuitry of the measuring set. The ground terminal 37 may also be grounded by lead 37b to a grounding element 17 supported by the wall of the probe box 11. The circuit board 15 supports a negative voltage supply terminal 31 and a positive voltage supply terminal 33 respectively connected to leads 31a and 33a for connection to the circuitry of the measuring set. The circuit board supported terminal 30 whose signals are processed by the probe circuitry has a lead 30a which extends to the circuitry of the measuring set. The terminal leads 37a, 33a, 31a and 30a are grouped into a flexible nonconducting tube 18 which extends through a nipple 19 fitted into a hole formed in the bottom wall of the probe box 11. The lead containing tube 18 may be enclosed in a flexible nonconducting jacket 19'.

A probe cable assembled as above described extends from the probe head 1 and through the tubular handpiece 2 thereof. Since the probe circuits 20 in both probes A and B are identical, probe cables 19A and 19B formed as above described extend from the lower ends of the two handpieces as shown in FIG. 15. The probe cables 19A and 19B are telescoped through a flexible conduit 45 whose lower end is attached to a plug associated with the measuring set case.

Figure 14:
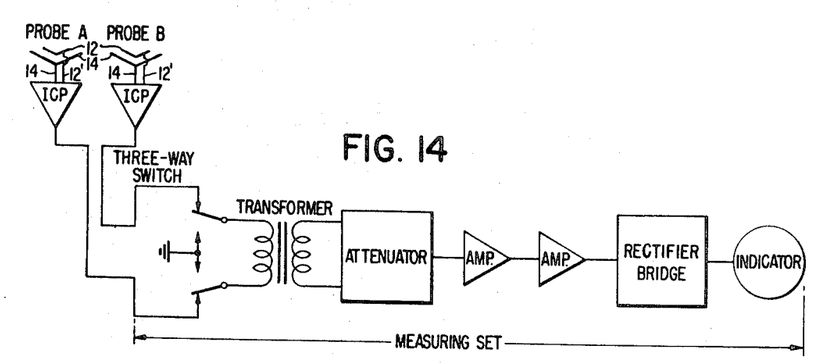
FIG. 14 is a block diagram which illustrates in a general way the manner in which a pair of test probes made in accordance with this invention may be associated with a measuring set to provide an apparatus system whereby the quality, integrity and continuity of the shields of electrical cables and wiring may be measured and determined.

The measuring set as diagrammatically illustrated in FIG. 14 generally comprises a transformer whose secondary winding is connected to a voltage divider or attenuator leading to a first stage operational amplifier, thence to a second stage operational amplifier, thence to a rectifier bridge and an indicator or voltage meter from which the voltage readings can be taken. A questioned length or section of cable can be tested by the use of two similar probes connected to a three-way switch leading to the primary winding of the transformer, and which can be adjusted to permit readings of the voltage differential between the space probes, as well as the voltage existing between each probe and ground. From these readings the condition of the cable under test can be determined, all is more particularly explained in our parent U.S. Pat. No. 3,711,767.

A pair of probe structures made as above described, are admirably adapted for testing, evaluating and measuring the continuity of shield splicings of insulated telephone and communication cables; and for evaluating, determining, testing and measuring the voltage of various other forms of electrical conductors and cables and sectional lengths thereof; and for identifying the location of defects and faults which impair electrical transmission therethrough.

This invention may be embodied in other specific forms without departing from the spirit or essential characteristics thereof. The present embodiment is therefore to be considered in all respects as illustrative and not restrictive, the scope of the invention being indicated by the appended claims rather than by the foregoing description, and all changes which come within the meaning and range of equivalency of the claims are therefore intended to be embraced therein.

We claim:

1. A probe structure designed to be capacitively coupled to an insulated electrical conductor installed in the field without damage to the insulation, said probe structure being operative to pick up through said insulation electrical signals induced on or carried by a selected internal part of the conductor and convert signals having high input impedance into stable signals capable of audible or scientific measurement; said probe structure including a signal pickup plate formed of conductive material designed to be capacitively coupled to the conductor, a shielding plate formed of conductive material extending parallel to and positioned below and having a larger area than said signal pickup plate, the underface of said shielding plate being bonded to a head block formed of nonconductive material and the upper face of said shielding plate being bonded to the superimposed signal pickup plate by an intermediate layer of insulating plastic, a protective facing of wear resistant and nonconductive material covering the upper face of said signal pickup plate and all surrounding areas of said shielding plate and head block; a base box supporting said head block, electronic components forming a unity gain high input impedance converting circuit contained in said base box and positioned adjacent to the underside of said head block, and a pair of electrical connectors extending through said head block and respectively electrically connecting said signal pickup plate and said shielding plate to said impedance converting circuit.

2. A probe structure as specified in claim 1 characterized by a V-shaped facing layer whose side faces are inclined to each other at an angle in the order of 90° to 150°.

3. A probe structure as specified in claim 1 and wherein said protective layer, signal pickup plate, intermediate plastic layer, shielding plate and plastic head block are compactly assembled as an integral unit by heat and pressure.

4. A probe structure designed to be capacitively coupled to an insulated electrical conductor installed in the field without damage to the insulation, said probe structure being operative to pick up through said insulation electrical signals induced on or carried by a selected internal part of the conductor and convert signals having high input impedance into stable output signals capable of audible or scientific measurement; said probe structure including a V-shaped signal pickup plate formed of conductive material designed to be capacitively coupled to said conductor, a V-shaped shielding plate formed of conductive material extending parallel to and positioned below said signal pickup plate and having a larger area than said signal pickup plate, the underface of said shielding plate being bonded to the upper face of a head block formed of nonconductive plastic, an intermediate bonding layer of nonconductive plastic sandwiched between said shielding plate and signal pickup plate, a protective facing layer of wear resistant and nonconductive material covering said signal pickup plate and all surrounding areas of said shielding plate and head block, a base box supporting said head block, a printed circuit board contained in said base box and suspended from and adjacent to the underside of said head block, electronic components forming a unity gain high input impedance converting circuit contained in said base box and supported by said circuit board, and a pair of electrical leads extending through said head block and respectively electrically connecting said signal pickup plate and said shielding plate to said impedance converting circuit.

5. A probe structure as defined in claim 4 and wherein said high impedance converting circuit includes a field effect transistor whose gate is connected to said pickup electrode and whose source is connected to the noninverting input of a unity gain voltage follower, said unity gain voltage follower having a low output impedance terminal, said low output impedance terminal being connected to the inverting input of said unity gain voltage follower and to said shielding electrode to thereby provide a driven shield.

6. A probe structure as defined in claim 4 and wherein said impedance converting circuit embraces a voltage follower device having a high impedance signal input terminal connected to said pickup electrode, a direct current power input terminal, and a signal output terminal, a second voltage follower having its input terminal connected to the output terminal of said first voltage follower device and a low impedance output terminal connected to said shielding electrode, and means for coupling signal frequency potentials from the output of said second voltage follower device to the power input terminal of said first voltage follower device.

7. A probe structure for evaluating the integrity of the shielding of an insulated and shielded communication cable installed in the field and without damage to the insulation, said probe structure including; a head block formed from nonconducting plastic and presenting a V-shaped upper face bonded to a V-shaped shielding electrode, a V-shaped pickup electrode of smaller area than said shielding electrode and bonded to said shielding electrode by an intermediate nonconductive plastic layer, and a facing layer formed of wear resistant and nonconductive plastic covering and bonded to said pickup electrode and the surrounding areas of said shielding electrode and plastic head block; a base box supporting said head block, a circuit board contained within said base box and suspended from the underside of the head block, electronic components forming a high impedance converting circuit mounted on said circuit board and embracing an operational amplifier of voltage follower configuration having a noninverting input terminal connected to the said pickup electrode and an output terminal connected to the inverting input terminal of said amplifier and to said shielding electrode plate to thereby provide a driven shield.

8. A probe structure as defined in claim 7 which further includes a handpiece member, and means for adjustably connecting one end of said handpiece member to said base box and whereby said base box may be frictionally adjusted to place the pickup electrode plate firmly against the insulated cable whose shielding integrity is to be evaluated.

9. A probe structure for evaluating the integrity of the shielding of an insulated and shielded communication cable installed in the field and without damage to the insulation, said probe structure including; a head block formed from nonconducting plastic and presenting a V-shaped upper face bonded to a V-shaped shielding electrode, a V-shaped pickup electrode of smaller area than said shielding electrode and bonded together by an intermediate nonconductive plastic layer, and a facing layer formed of wear resistant and nonconductive material covering and bonded to said pickup electrode and the surrounding areas of said shielding electrode and plastic head block; a base box supporting said head block, and a unity gain high impedance converting circuit contained in said base box and positioned adjacent to the underside of said head block, said high impedance converting circuit embracing the combination of a field effect transistor whose gate is connected to said pickup electrode, and an integrated circuit unity gain voltage follower, the output of said transistor being connected to the noninverting input of said voltage follower and the output of said voltage follower being connected to the inverting input of said voltage follower and to the shielding electrode to thereby provide a driven shield.

10. A probe structure as defined in claim 9 which further includes a positive direct current source connected to said voltage follower and through a first resistor to the drain terminal of said transistor; and a negative direct current source connected to said voltage follower and through a second resistor to the output terminal of said transistor.

11. A probe structure as defined in claim 9 which further includes; a positive direct current source connected to said voltage follower and through a first resistor to the drain terminal of said transistor, a negative direct current source connected to said voltage follower and through a second resistor to the output terminal of said transistor; a grounding terminal connected through a third resistor and a first capacitor to the output terminal of said voltage follower, said third resistor being further connected through a fourth resistor to the gate of said transistor, the output terminal of said voltage follower being further connected through a second capacitor to the drain terminal of said transistor.

12. A probe structure as defined in claim 9 which further includes; a handpiece member, means for adjustably securing one end of said handpiece member to said base box and whereby said base box may be frictionally adjusted to place the pickup electrode firmly against the insulated cable whose shielding integrity is to be evaluated, a crossbar, an adjustable clamp at the other end of said handpiece member for frictionally securing the handpiece member to said crossbar and whereby the pickup electrode may be frictionally held in tilted position to accommodate the position of the cable, a supporting pole connected to the cross-bar, and a bracing member extending from said crossbar and adapted to brace against the cable to facilitate coupling contact between the pickup electrode and the cable.

* * * * *

UNITED STATES PATENT OFFICE
CERTIFICATE OF CORRECTION

Patent No. 3,798,541           Dated March 19, 1974

Inventor(s) Richard H. Campbell Jr. and William B. Wilkens

It is certified that error appears in the above-identified patent and that said Letters Patent are hereby corrected as shown below:

Column 3 line 65, change "7a" to --7--

Column 4 line 1, change "7b" to --7A--
          line 64, change "as" to --As--

Column 7 line 66, change "head" to --lead--

Column 8 line 14, change "resistor" to --transistor--

Column 9 line 34, change "head" to --lead--

Signed and sealed this 10th day of September 1974.

(SEAL)
Attest:

McCOY M. GIBSON, JR.          C. MARSHALL DANN
Attesting Officer              Commissioner of Patents